(12) United States Patent
Aras et al.

(10) Patent No.: US 11,821,503 B2
(45) Date of Patent: Nov. 21, 2023

(54) HARMONIC DRIVE AND METHOD FOR PRODUCING HARMONIC DRIVE

(71) Applicant: Schaeffler Technologies AG & Co. KG, Herzogenaurach (DE)

(72) Inventors: Resat Aras, Fürth (DE); Richard Baier, Aurachtal (DE); Harald Hofmann, Herzogenaurach (DE); Rainer Ottersbach, Aurachtal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 181 days.

(21) Appl. No.: 17/414,307

(22) PCT Filed: Oct. 14, 2019

(86) PCT No.: PCT/DE2019/100887
§ 371 (c)(1),
(2) Date: Jun. 15, 2021

(87) PCT Pub. No.: WO2020/125843
PCT Pub. Date: Jun. 25, 2020

(65) Prior Publication Data
US 2022/0065340 A1    Mar. 3, 2022

(30) Foreign Application Priority Data

Dec. 17, 2018 (DE) ..................... 10 2018 132 400.6

(51) Int. Cl.
*F16H 49/00* (2006.01)
*F01L 1/352* (2006.01)

(52) U.S. Cl.
CPC ............ *F16H 49/001* (2013.01); *F01L 1/352* (2013.01); *F01L 2001/3521* (2013.01); *F01L 2303/00* (2020.05); *F16H 2049/003* (2013.01)

(58) Field of Classification Search
CPC .......................... F16H 49/001; F16H 2049/003
(Continued)

(56) References Cited

U.S. PATENT DOCUMENTS 3,558,944 A * 1/1971 Verge ..................... H02K 41/06
310/82
3,986,412 A * 10/1976 Farley .................. F16H 49/001
475/5
(Continued)

FOREIGN PATENT DOCUMENTS

DE    102009037403 A1    2/2011
DE    102013216183 A1    2/2015
(Continued)

OTHER PUBLICATIONS

See Corresponding Search Report PCT/DE2019/100887.

*Primary Examiner* — Ha Dinh Ho
(74) *Attorney, Agent, or Firm* — Davidson, Davidson & Kappel, LLC

(57) ABSTRACT

A harmonic drive, more particularly in an electromechanical camshaft phaser, comprises a drive element (2), a flexible transmission element (26) connected to the drive element (2) and having external teeth (29), and an output element (4) that is designed as a ring gear and has internal teeth (30) that partially mesh with the external teeth (29). The flexible transmission element (26) is pot-shaped, and is coupled in a torque-transmitting manner to the drive element (2) radially inside the outer teeth (29).

16 Claims, 17 Drawing Sheets

(58) Field of Classification Search
USPC .......................................................... 74/640
See application file for complete search history.

(56) References Cited

U.S. PATENT DOCUMENTS

| | | | | |
|---|---|---|---|---|
| 4,237,751 | A * | 12/1980 | Davis | F16H 49/001 |
| | | | | 416/170 R |
| 8,020,470 | B2 * | 9/2011 | Saito | F16H 49/001 |
| | | | | 74/640 |
| 11,384,825 | B2 * | 7/2022 | Fanelli | F16H 49/001 |
| 2016/0333749 | A1 | 11/2016 | Kohrs et al. | |
| 2019/0153909 | A1 | 5/2019 | Hain et al. | |
| 2020/0003289 | A1 | 1/2020 | Heise | |
| 2020/0116246 | A1 | 4/2020 | Weber et al. | |

FOREIGN PATENT DOCUMENTS

| | | |
|---|---|---|
| DE | 102014202060 A1 | 8/2015 |
| DE | 102016205748 B3 | 7/2017 |
| DE | 102016218575 A1 | 8/2017 |
| DE | 102016204784 A1 | 9/2017 |
| DE | 102017111682 A1 | 11/2017 |
| DE | 102017114069 A1 | 5/2018 |
| DE | 102017126527 A1 | 5/2018 |
| DE | 102017103988 B3 | 6/2018 |
| DE | 102017114175 B3 | 9/2018 |
| DE | 102017121320 B3 | 10/2018 |
| DE | 102017112032 A1 | 12/2018 |
| EP | 1043482 A2 | 10/2000 |
| WO | WO2015021972 A2 | 2/2015 |

* cited by examiner

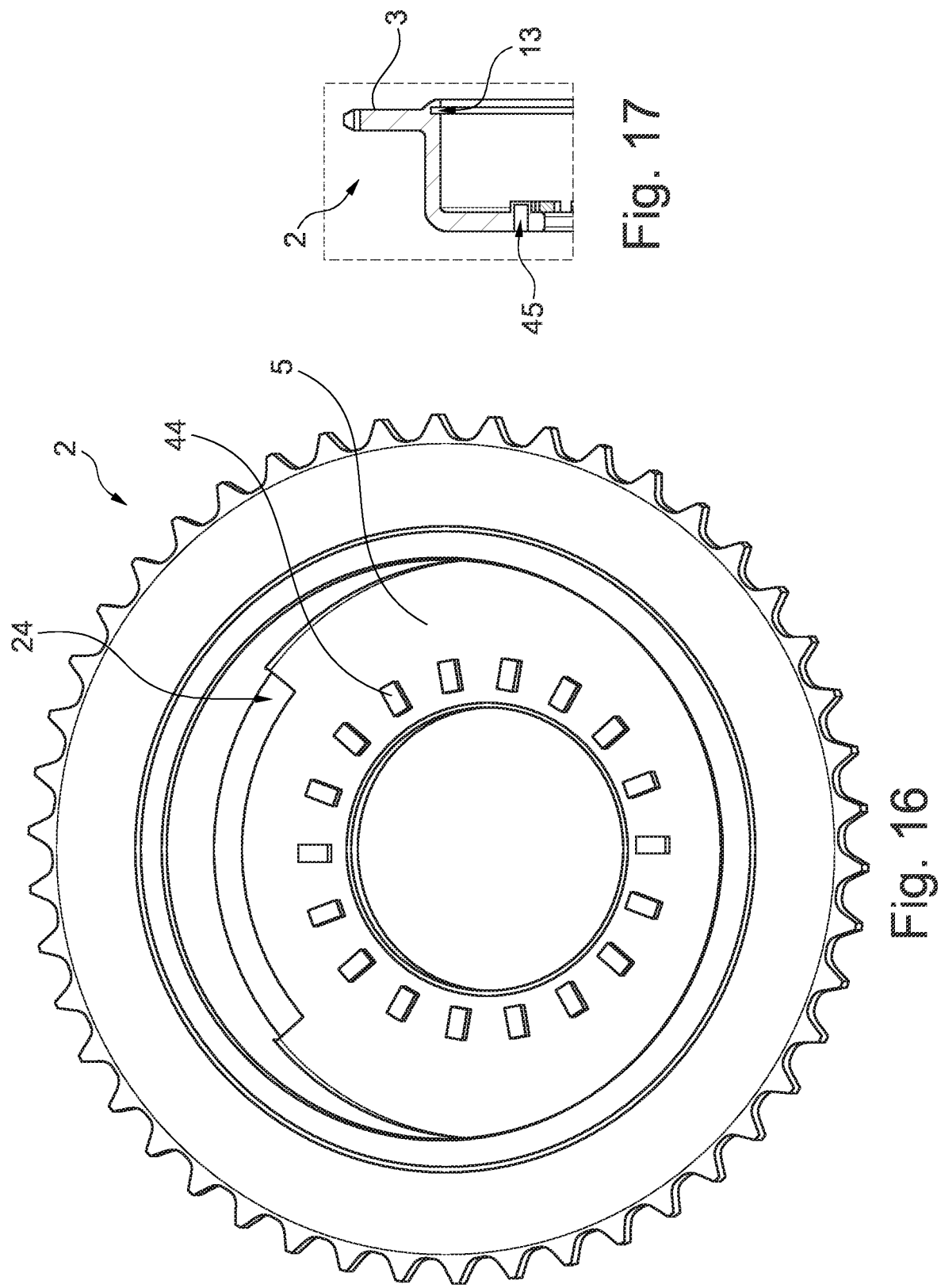

HARMONIC DRIVE AND METHOD FOR PRODUCING HARMONIC DRIVE

CROSS-REFERENCE TO RELATED APPLICATIONS

This application is the U.S. National Phase of PCT Appln. No. PCT/DE2019/100887 filed Oct. 14, 2019, which claims priority to DE 10 2018 132 400.6 filed Dec. 17, 2018, the entire disclosures of which are incorporated by reference herein.

The present disclosure relates to a harmonic drive, in particular suitable for use as an adjusting gear in an electromechanical camshaft adjuster. The present disclosure further relates to a method for producing such a harmonic drive.

BACKGROUND

A generic harmonic drive is known for example from DE 10 2016 218 575 A1. The harmonic drive has a flexible, externally toothed transmission element in the form of a collar sleeve. The collar sleeve has a cylindrical section provided with external teeth. Starting from the cylindrical section, a flange is directed radially outward, which is also referred to as a collar. The collar is connected to a housing of the harmonic drive by a screw connection. The housing can be rotated as a whole and represents the drive element of the harmonic drive. The output element is designed as a ring gear rotatably mounted in the housing and has internal teeth which partially mesh with the external teeth of the flexible transmission element.

Another harmonic drive with a flexible transmission element designed as a collar sleeve is disclosed in DE 10 2017 126 527 A1. In this case, in contrast to DE 10 2016 218 575 A1, the output element designed as a ring gear is also designed as a flexible transmission element.

Harmonic drives with modified forms of collar sleeves are described in DE 10 2017 114 175 B3 and DE 10 2017 103 988 B3. In these cases too, a flange, which does not necessarily form a complete annular disc shape, is directed radially outward from an externally toothed, cylindrical section of the flexible transmission element. The flange, that is to say collar, which has the basic shape of an annular disc, is followed in both cases by a section which concentrically surrounds the externally toothed section and is connected to a drive element in a rotationally fixed manner.

Documents DE 10 2016 205 748 B3, DE 10 2017 121 320 B3 and DE 10 2016 204 784 A1 show different designs of harmonic drives, which each work with a pot-shaped flexible transmission element. The pot-shaped flexible transmission element is permanently connected to the output shaft of the harmonic drive in all cases.

A common feature of harmonic drives with a collar-shaped, i.e., hat-shaped, transmission element and harmonic drives with a pot-shaped, resilient transmission element is that the teeth of the flexible transmission element only engage in the toothing of one single further, usually rigid, transmission element. This is a fundamental difference to harmonic drives, which have a flex ring as a resilient transmission element: The teeth of the flex ring mesh at the same time with teeth of a drive-side ring gear on and with teeth of an output-side ring gear. In this context, reference is made to DE 10 2014 202 060 A1 as an example. A flex ring is generally understood to mean a toothed, ring-shaped, elastically resilient transmission element which has no extensions directed radially inward or outward, for example in the form of a bottom or a flange.

SUMMARY

An object of the present disclosure is to disclose a harmonic drive which has been further developed compared to the prior art, which is characterized by a particularly favorable ratio between transmittable torques and required installation space, while providing a production-friendly structure at the same time.

The object is achieved by a harmonic drive of the present disclosure and also by a method for producing a harmonic drive of the present disclosure. The configurations and advantages of the present disclosure explained below in connection with the production method also apply analogously to the device, i.e., the harmonic drive, and vice versa.

In a basic concept known per se, the harmonic drive comprises a drive element, a flexible transmission element with external teeth connected to the drive element, and an output element designed as a ring gear, which has internal teeth partially meshing with the external teeth of the flexible transmission element.

According to the present disclosure, the flexible transmission element is pot-shaped, wherein it is coupled to the drive element radially inside its external teeth in a manner suitable for transmitting a torque.

The pot-shaped design of the flexible transmission element means that a radially inwardly directed section extends from the sleeve-shaped section of the flexible transmission element provided with the external teeth and is referred to as the bottom of the pot-shaped transmission element. The bottom has an annular disc-shaped basic shape and is not closed. There is no section of the flexible transmission element which is directed radially outward from the externally toothed section. This means that the outer peripheral surface of the flexible transmission element is formed by its external teeth. In comparison to conventional transmissions with a flexible transmission element designed as a collar sleeve, a particularly large teeth diameter of the flexible transmission element can be selected, which means a particularly high transmittable torque in relation to the required installation space.

The harmonic drive according to the present disclosure differs fundamentally from conventional harmonic drives with a pot-shaped, resilient transmission element in that the flexible pot-shaped transmission element is held non-rotatably on the drive element of the harmonic drive rather than on the output element. The holder of the pot-shaped flexible transmission element on the drive element can be subject to play. Here, the play between the drive element and the flexible pot-shaped transmission element is preferably less in the peripheral direction of the elements mentioned than in the other direction, that is, in the axial and radial directions.

In a preferred embodiment, there is a form-fitting coupling between the drive element and the flexible pot-shaped transmission element, wherein openings are located in the bottom of the flexible transmission element, in which form-fitting elements, in particular in the form of pins or knobs, of the drive element engage. In a particularly preferred embodiment, the openings in the bottom of the flexible transmission element are delimited in both peripheral directions of this transmission element by contact flanks which are bent out of the bottom of the flexible transmission element. It is also possible to implement embodiments, in which the form-fitting elements on the drive element side and the form-fitting elements on the flexible transmission element side are designed in the same way, for example as teeth.

Through the contact flanks, that is, tabs bent out of the bottom of the flexible, pot-shaped transmission element, sliding surfaces are provided which serve to transmit torque between the drive element and the flexible transmission element and couple the two mentioned elements with one another with little or practically no play in the peripheral direction, wherein mobility between the two elements, in particular in their axial direction, is retained. In this way, during operation of the harmonic drive, forced deformations of the sleeve-shaped, externally toothed section of the flexible transmission element can be absorbed by the likewise resilient bottom of this transmission element, wherein the backlash connection of the flexible transmission element on the drive element contributes significantly to the fact that torque irregularities, so-called ripples, are largely avoided. The controllability of the harmonic drive and the durability of the elastic transmission element also benefit from avoiding torque irregularities.

The openings and the contact flanks can be produced efficiently by non-cutting processes. In the same way, stop contours can be generated in the inner peripheral surface of the sleeve-shaped section of the pot-shaped transmission element, which secure a wave generator provided for deforming the flexible transmission element in an axial direction relative to the flexible transmission element and thus also relative to the drive element. The above-mentioned stop contours are, for example, approximately punctiform impressions which can be seen as knobs on the inner peripheral surface of the sleeve-shaped section of the pot-shaped flexible transmission element. The impressions are preferably located in a region of the sleeve-shaped section that is not externally toothed, that is to say, apart from the impressions, has a smooth outer peripheral surface.

In the axial direction opposite the bottom of the flexible transmission element, the wave generator is preferably secured directly by the output element designed as a ring gear. The ring gear itself is secured in this direction with respect to the drive element, for example by a locking ring which engages in a groove on an inner peripheral surface of the drive element.

The adjustment range of the harmonic drive is determined by the maximum angle of rotation between the drive element and the output element. Preferably, a rotation angle limitation is formed directly by the contours of the drive element and the output element.

According to a first possible variation, the rotation angle limitation is formed by a stop segment of the drive element and a recess in an otherwise ring-shaped, end face strip of the output element.

According to a second possible variation, the rotation angle limitation is formed by an opening in the drive element and a stop segment of the output element engaging in the opening.

Regardless of the type of rotation angle limitation, the harmonic drive can be produced as follows:
provision of a pot-shaped drive element designed as a transmission element of a belt drive, in particular a chain drive, wherein form-fitting elements of the first type are formed on the bottom of the drive element,
provision of a flexible, pot-shaped, externally toothed transmission element, wherein form-fitting elements of the second type are formed on the bottom of this transmission element,
provision of a wave generator designed to deform the flexible transmission element, which comprises in particular a ball bearing as a rolling bearing,
provision of an internally toothed output element designed as a ring gear, which is provided for the non-rotatable connection with the shaft to be adjusted,
insertion of the wave generator into the flexible transmission element,
insertion into the output element of the assembly formed by the wave generator and the flexible transmission element, i.e., the so-called adjusting shaft,
sliding of the drive element onto the output element until a connection suitable for transmitting a torque is established between the various form-fitting elements,
securing of the output element with respect to the drive element in the axial direction by a locking ring.

If the harmonic drive is used to adjust a camshaft, the output element must be non-rotatably connected to the camshaft. The end face of the harmonic drive to which the shaft to be adjusted, that is to say, camshaft, is to be connected is referred to as the output-side end face. The bottom of the output element, which is designed as a ring gear, that is to say, pot-shaped, is located on the output-side end face of the harmonic drive. The non-closed bottom of the drive element is located on the end face of the harmonic drive opposite the shaft to be adjusted. The bottom of the flexible pot-shaped transmission element faces the same end face. This means that there are two pot-shaped elements, namely the drive element and the flexible transmission element, which are each open to the output side of the harmonic drive. The output element engages in an annular cavity formed between these two pot-shaped elements, it being largely or completely in the interior of the pot-shaped drive element.

In a preferred embodiment, the drive element is also designed as a transmission element of a belt drive, in particular as a chain wheel. The drive element can also be a belt wheel or a gear wheel. In principle, it is also possible to connect, for example to screw, the drive element to a separate chain wheel, belt wheel or toothed wheel. In the case of an integral design of a chain wheel or belt wheel with the drive element, such screw connections are not required. Likewise, in the designs described, no screw connections are provided between the flexible transmission element and the drive element. In principle, any type of connection between the flexible transmission element and the drive element can be selected, provided that the required torque transmission capacity is given. In addition to non-positive connections, there are in particular material connections, in particular in the form of welded or soldered connections.

The drive element, preferably in the form of a chain wheel, can be produced, for example, by powder metallurgy, that is to say, as a sintered part. Instead of powder metallurgy processes or in addition to such processes, machining processes are also suitable for producing the drive element.

In an alternative embodiment, the drive element is produced by means of forming. Examples of manufacturing steps for the manufacture of the chain wheel include sheet metal forming, punching and rolling. In a manner known per se, surface properties can be modified by heat treatment of the chain wheel, that is to say, the drive element of the harmonic drive. Hard machining of bearing surfaces of the drive element is also possible.

The chain wheel is to be designed according to the chain used, for example, a tooth chain or roller chain. The same applies if the drive element is designed as a belt wheel. In all cases, a force is introduced from the drive element into further components of the harmonic drive, preferably in such a way that the lowest possible tilting moments occur between the drive element and the output element. In general, the narrow design of the harmonic drive, that is to say, its minor expansion in the axial direction, favors operation with only small or negligible tilting moments. Due to the low tilting moments, the securing element, in particular in the form of a locking ring, which holds the output element in the drive element, is only exposed to low mechanical loads.

In contrast to conventional harmonic drives which work with a flex ring, the harmonic drive according to the present disclosure only requires a single internally toothed transmission element. In an advantageous embodiment, there are no screws on the drive element, which at the same time represents the housing of the harmonic drive. Overall, the drive element is a multifunctional component. The following are the individual functions of the drive element:

- provision of a contour for introducing a torque into the drive element, i.e., design of the drive element as a chain or belt wheel or as a gear wheel,
- non-rotatable and preferably at the same time selectively backlash-afflicted holder, i.e., connection with direction-dependent backlash, of the flexible transmission element on the bottom of the drive element,
- axial bearing of the output element in the drive element,
- radial bearing of the output element in the drive element,
- rotation angle limitation between the drive element and the output element.

There is no need for a separate axial bearing disc to support the output ring gear in one direction. The fact that the harmonic drive only has a single pair of teeth is beneficial to the high mechanical precision of the harmonic drive. The installation of the output ring gear in the drive element with play is independent of the method with which the drive element and the output element are manufactured. Just like the drive element, the output element can also be designed as a sintered part.

The kinematics of the harmonic drive according to the present disclosure is basically the same as the kinematics of a conventional harmonic drive with a collar sleeve. The harmonic drive is accordingly designed typically as a plus gear set. This means that, when an adjusting element of the wave generator is rotated with respect to the drive element in a first direction, the output element is adjusted in the same direction with respect to the drive element.

The harmonic drive can be used not only as an adjusting gear in vehicle technology, but also in industrial applications, for example, in a robot or in a machine tool.

BRIEF SUMMARY OF THE DRAWINGS

In the following, several exemplary embodiments of the present disclosure are explained in more detail by means of a drawing. In the figures:

FIG. 16 shows the drive element of the harmonic drive according to FIG. 8, FIG. 17 shows a detail section of the drive element according to FIG. 16.

DETAILED DESCRIPTION

Figure 1:
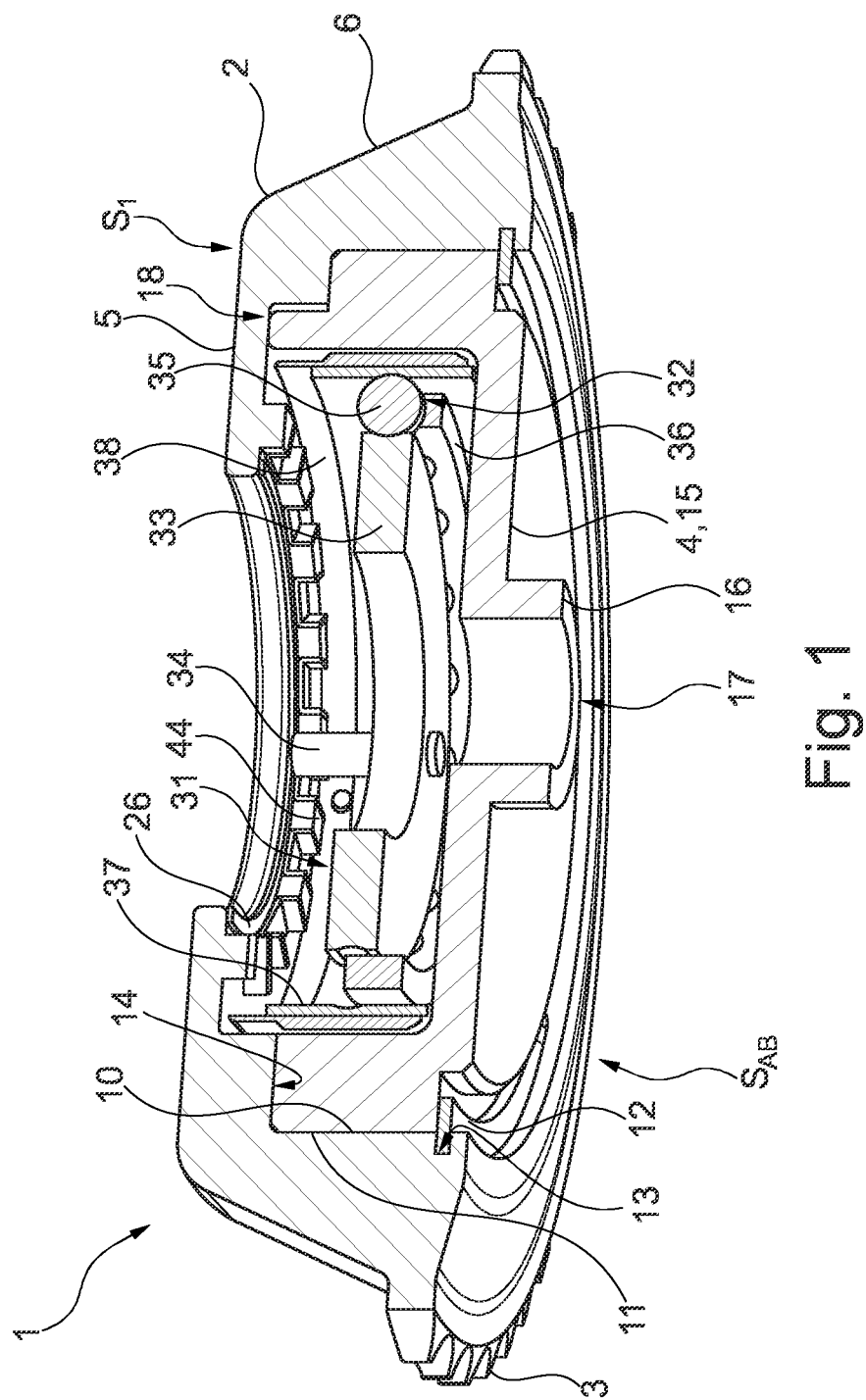
FIG. 1 shows a first exemplary embodiment of a harmonic drive in a sectioned, perspective view.
Figure 2:
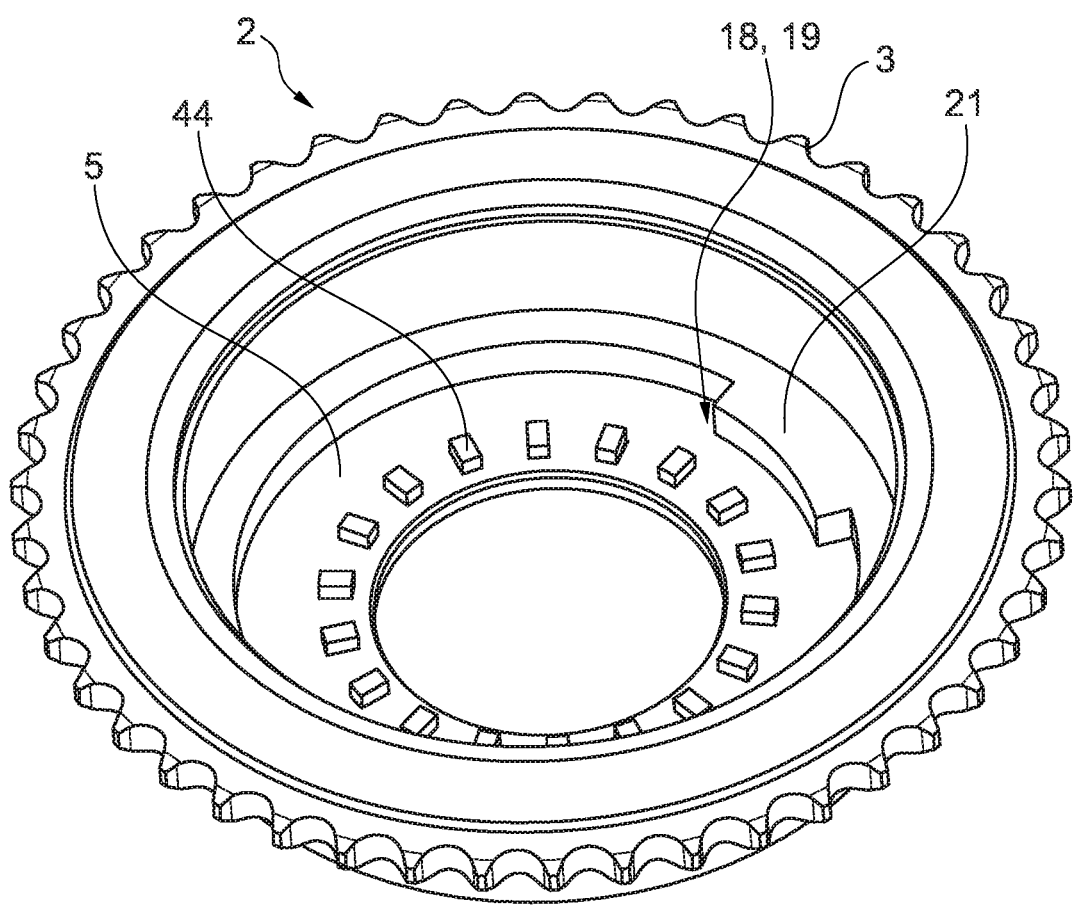
FIG. 2 shows a drive element, designed as a chain wheel, of the harmonic drive according to FIG. 1, FIGS. 3 and 4 show a flexible transmission element of the harmonic drive according to FIG. 1, designed as a toothing pot.

Unless otherwise stated, the following explanations relate to all exemplary embodiments. Parts that correspond to each other or have basically the same effect are always marked with the same reference symbols in the figures.

A harmonic drive, identified as a whole by reference numeral 1, is provided for use as an adjusting gear of an electromechanical camshaft adjuster of an internal combustion engine. The harmonic drive 1 is a three-shaft drive, with regard to the basic function of which reference is made to the prior art mentioned at the outset.

The harmonic drive 1 has a drive element 2 which at the same time represents the housing of the harmonic drive 1. A chain wheel 3 is an integral part of the drive element 2. In the exemplary embodiment according to FIG. 1, the drive element 2 is manufactured as a sintered part. In the exemplary embodiment according to FIG. 8, the drive element 2 is a transmission element produced by a forming process.

The drive element 2 is driven in all cases by a chain, wherein it rotates at half the crankshaft speed. A ring gear, which is rotatably mounted in the drive element 2, is provided as the output element 4 of the harmonic drive 1. The ring gear 4 is firmly connected to the shaft to be adjusted, that is, the camshaft of the internal combustion engine, by means of a central screw, not shown. The end face of the harmonic drive 1 to which the camshaft to be adjusted is connected is referred to as the output-side end face $S_{AB}$. The opposite end face is referred to as the first end face $S_1$. On the first end face $S_1$, there is an electric motor, not shown, which is provided for actuating the harmonic drive 1.

Figure 8:
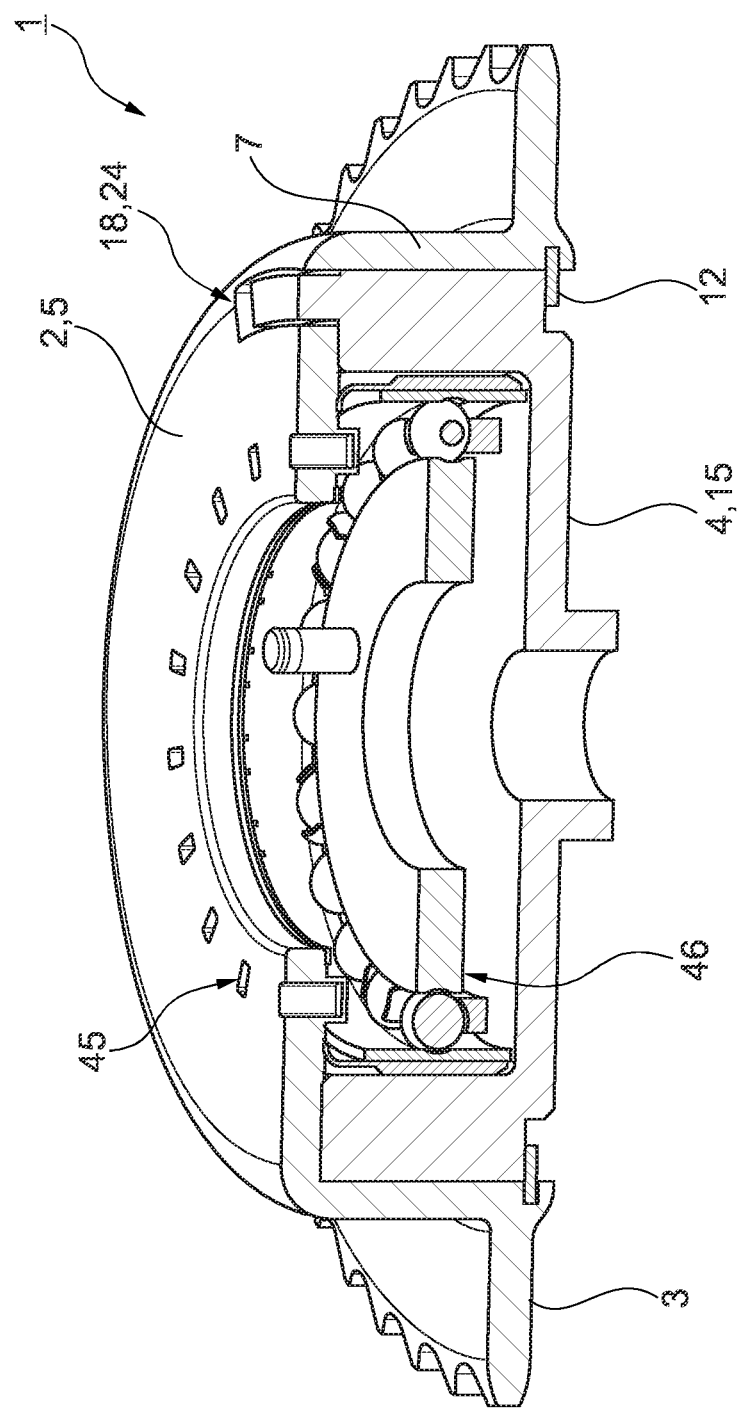
FIG. 8 shows a second exemplary embodiment of a harmonic drive in a sectional perspective view.
Figure 9:
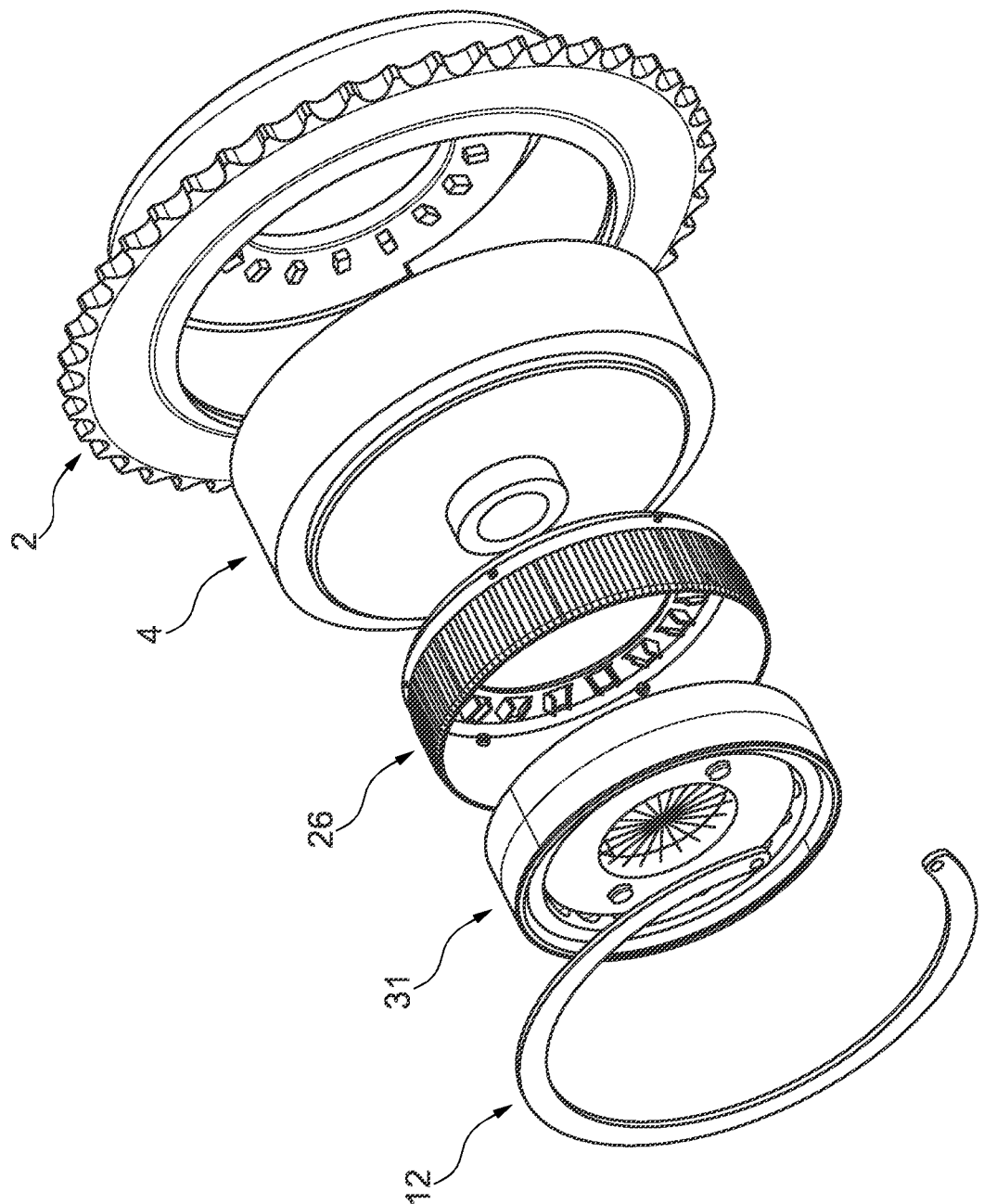
FIGS. 9 and 10 show the harmonic drive according to FIG. 8 in exploded views.
Figure 10:
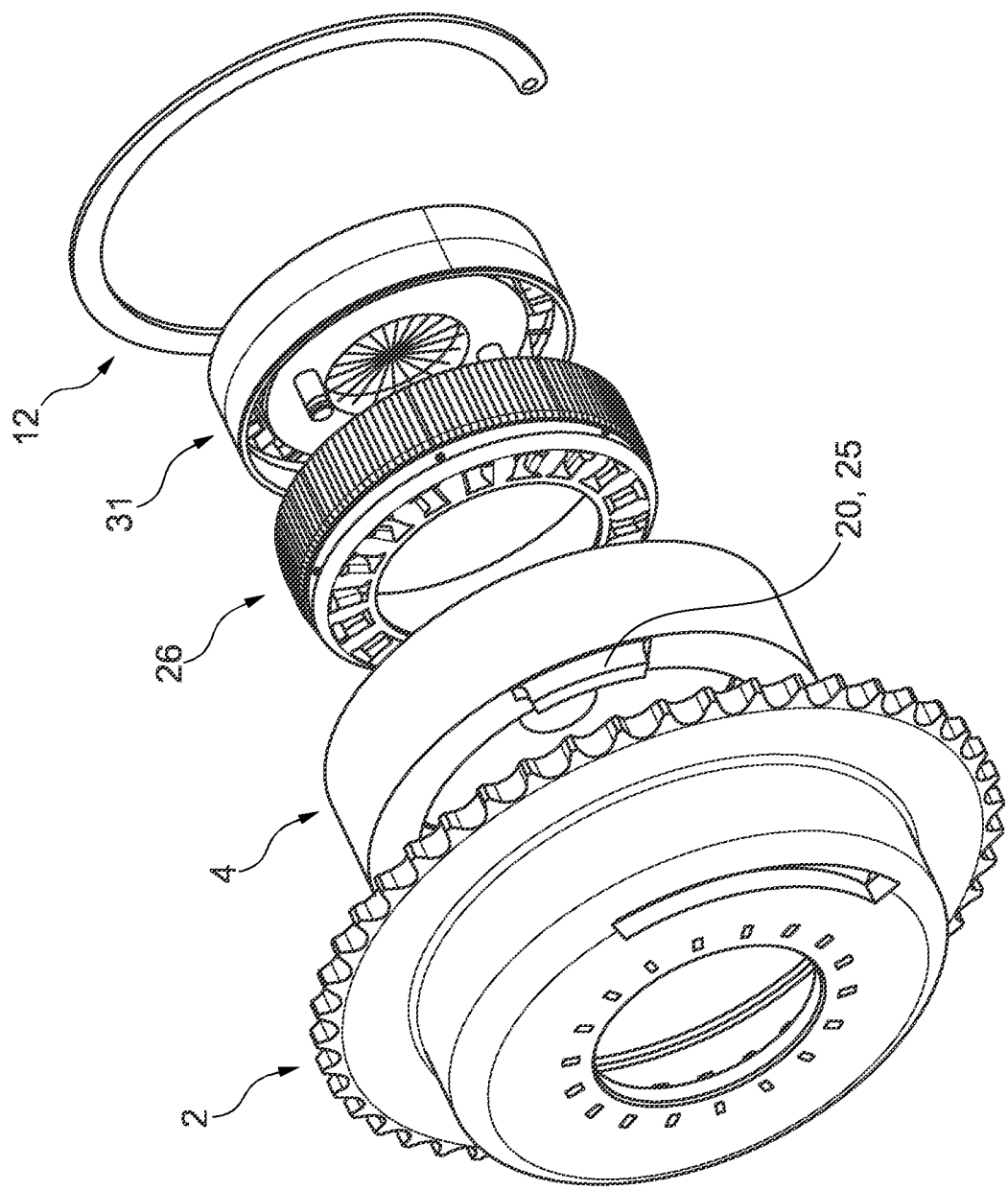
Figure 11:
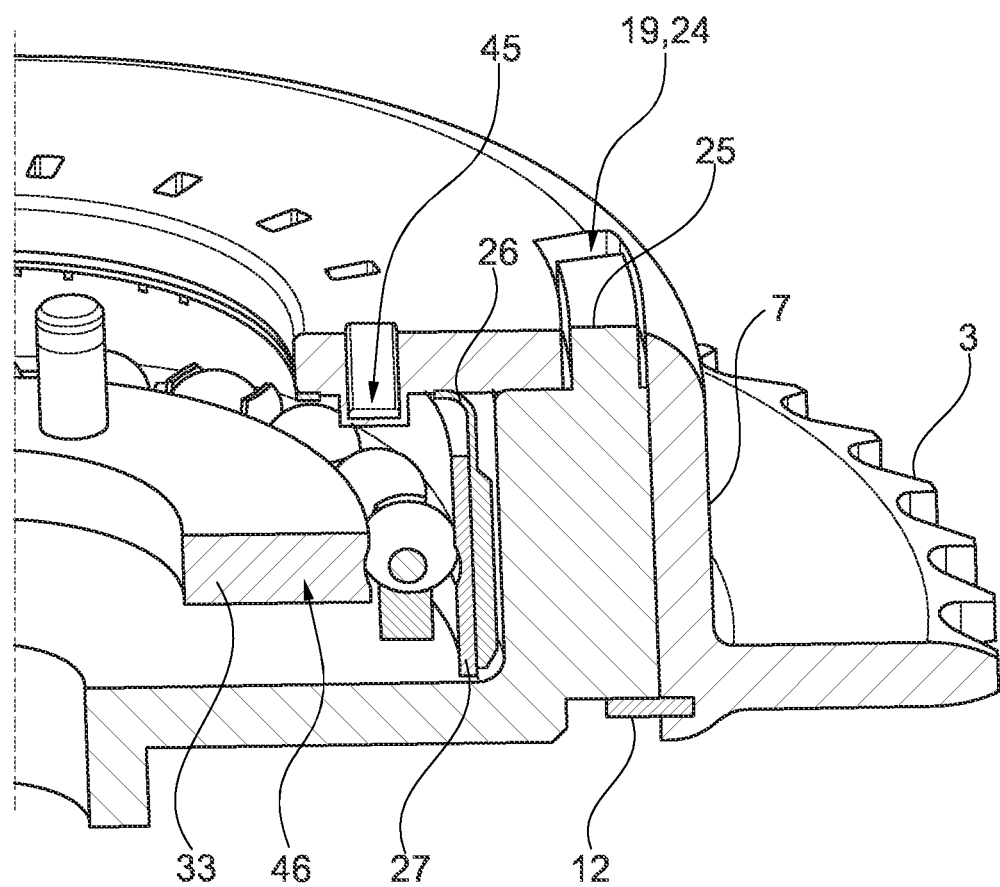
FIG. 11 shows a detailed view of the harmonic drive according to FIG. 8.
Figure 13:
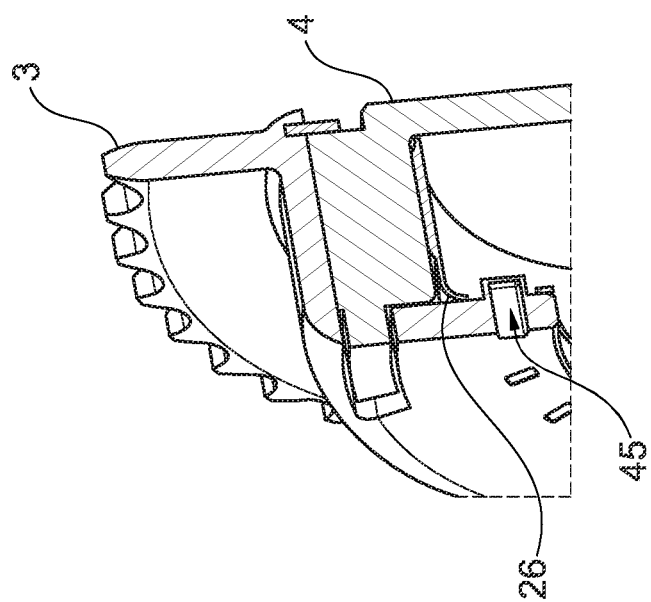
FIG. 13 shows a detail section of the arrangement according to FIG. 12 in a sectional perspective view.
Figure 12:
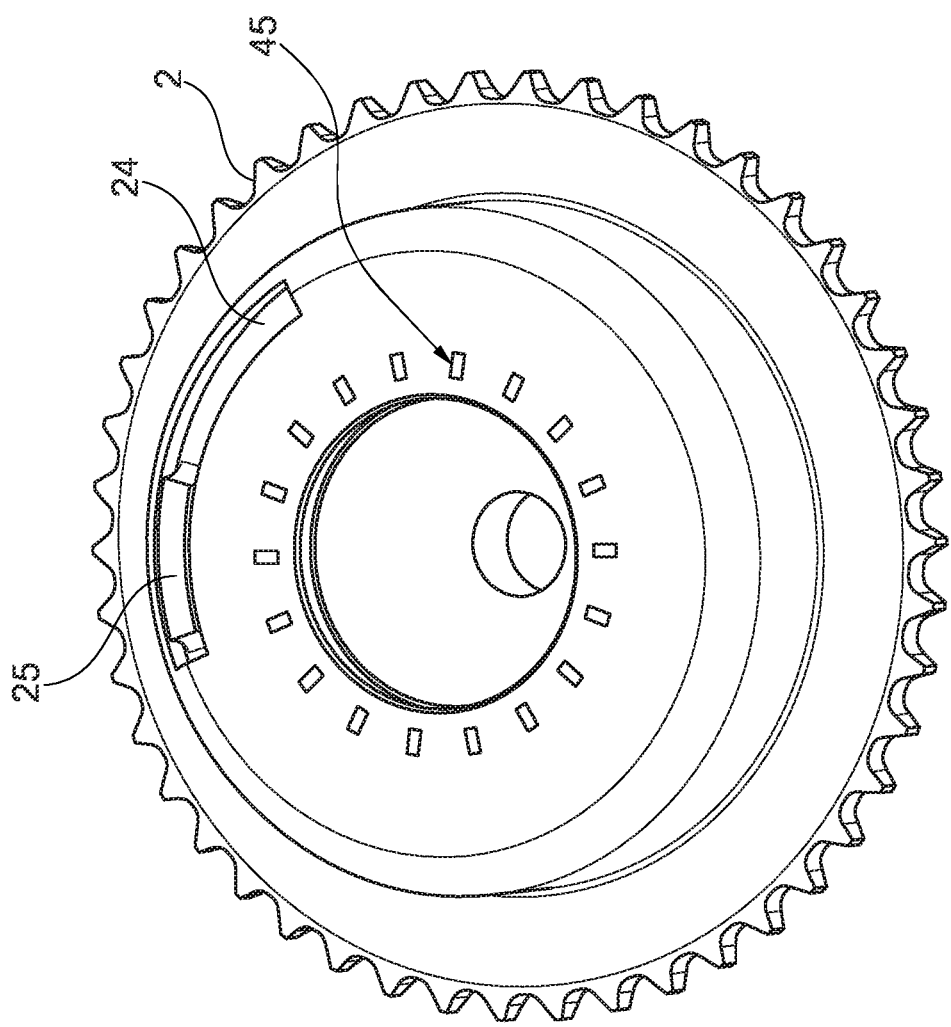
FIG. 12 shows a drive element, namely a chain wheel, of the harmonic drive according to FIG. 8 with an inserted output element and flexible transmission element.
Figure 15:
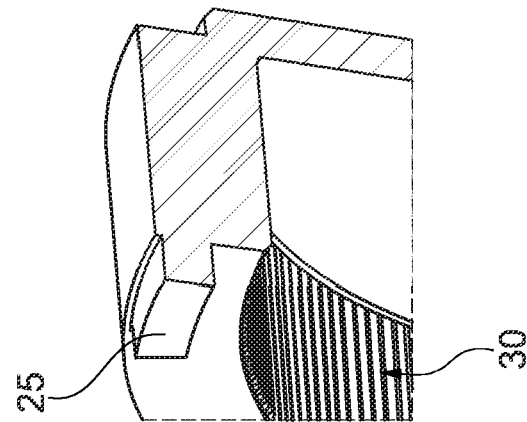
FIG. 15 shows a detail section of the output element according to FIG. 14.
Figure 14:
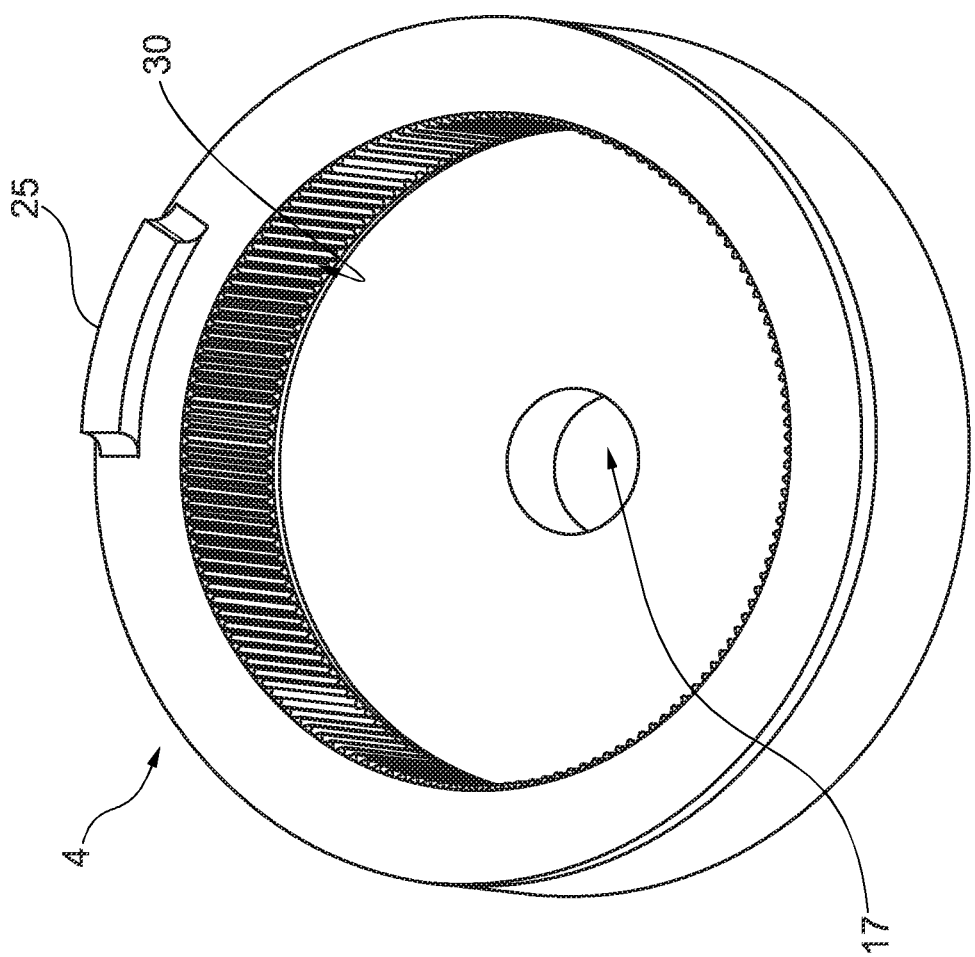
FIG. 14 shows the output element of the arrangement according to FIG. 12.
Figure 18:
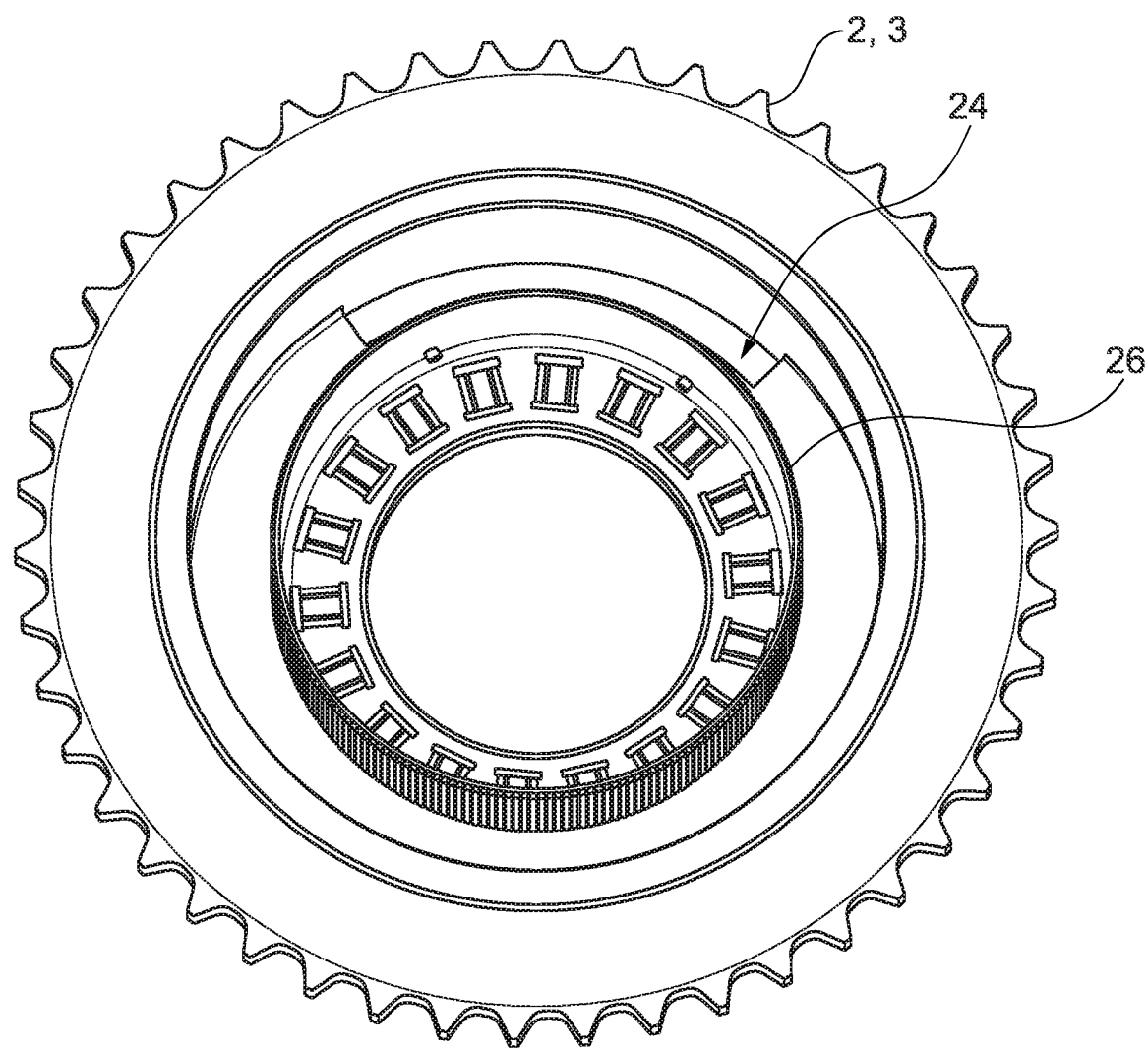
FIG. 18 shows the drive element according to FIG. 16 with inserted toothing pot.
Figure 19:
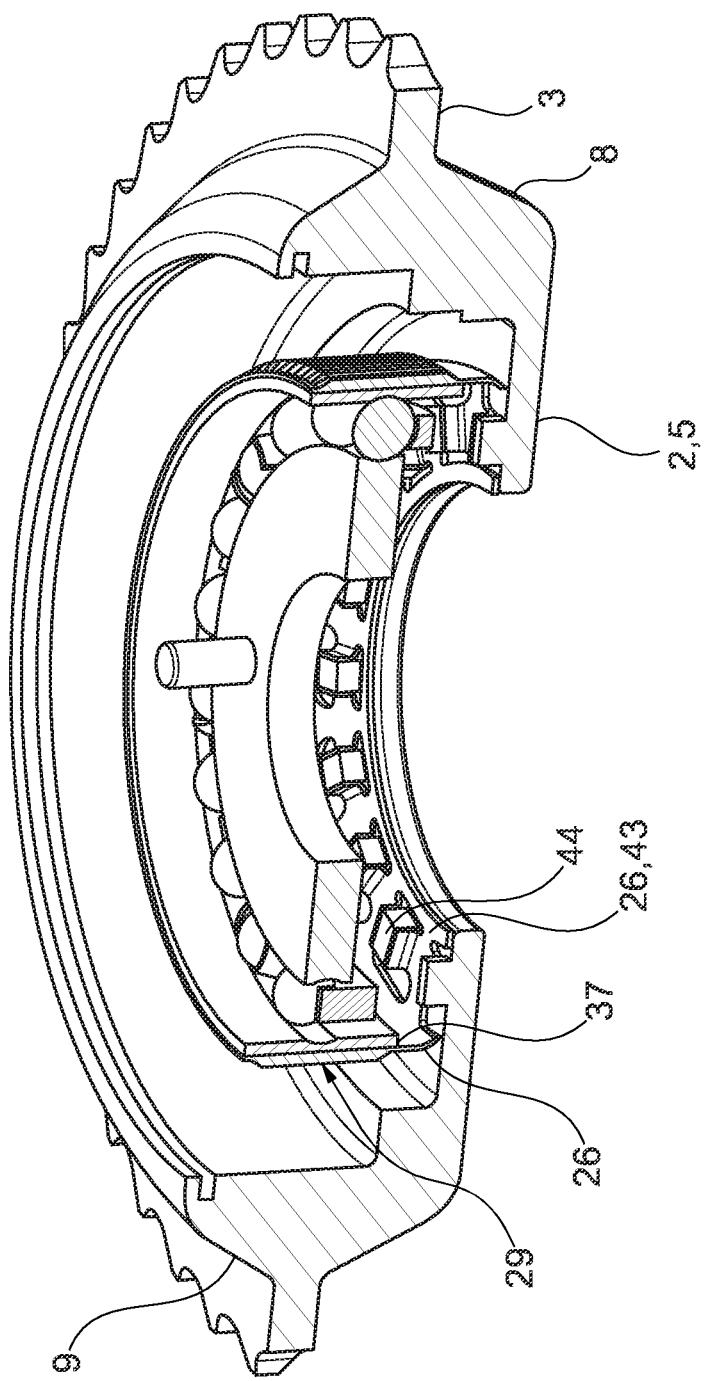
FIG. 19 shows components of a third exemplary embodiment of a harmonic drive in a perspective sectional view.
Figure 20:
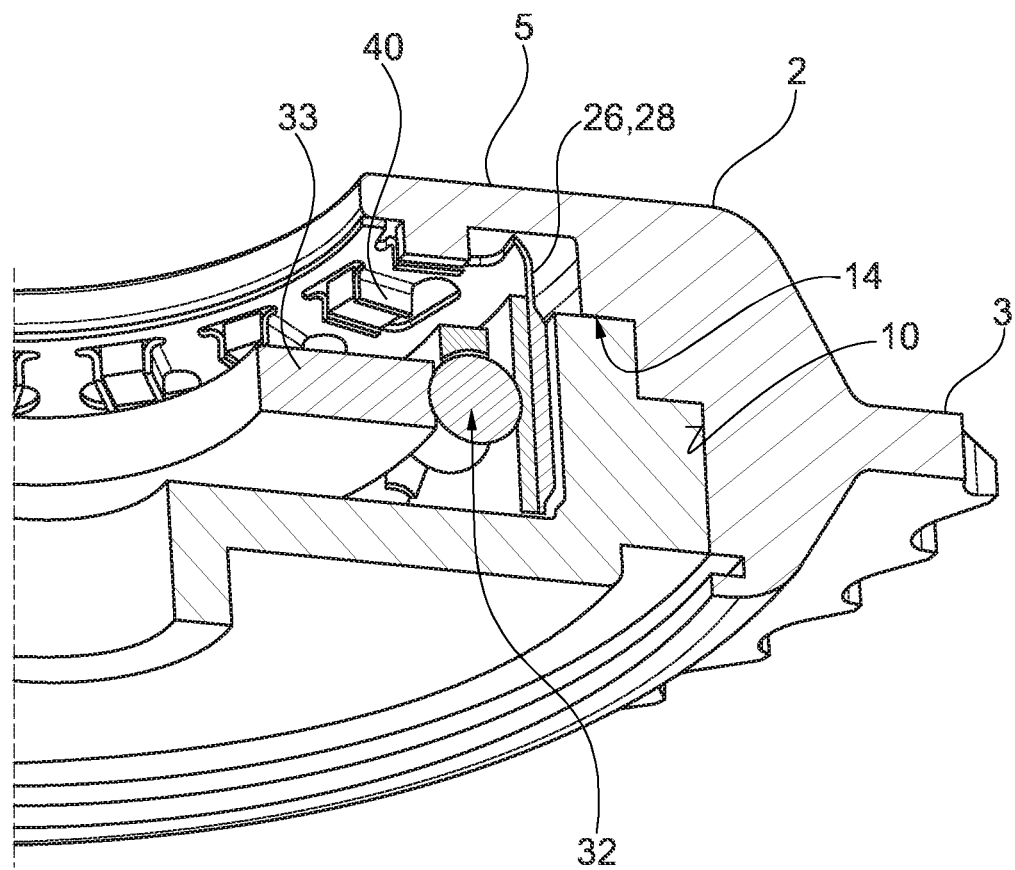
FIG. 20 shows the harmonic drive according to FIG. 19 in a further sectional perspective view.
Figure 21:
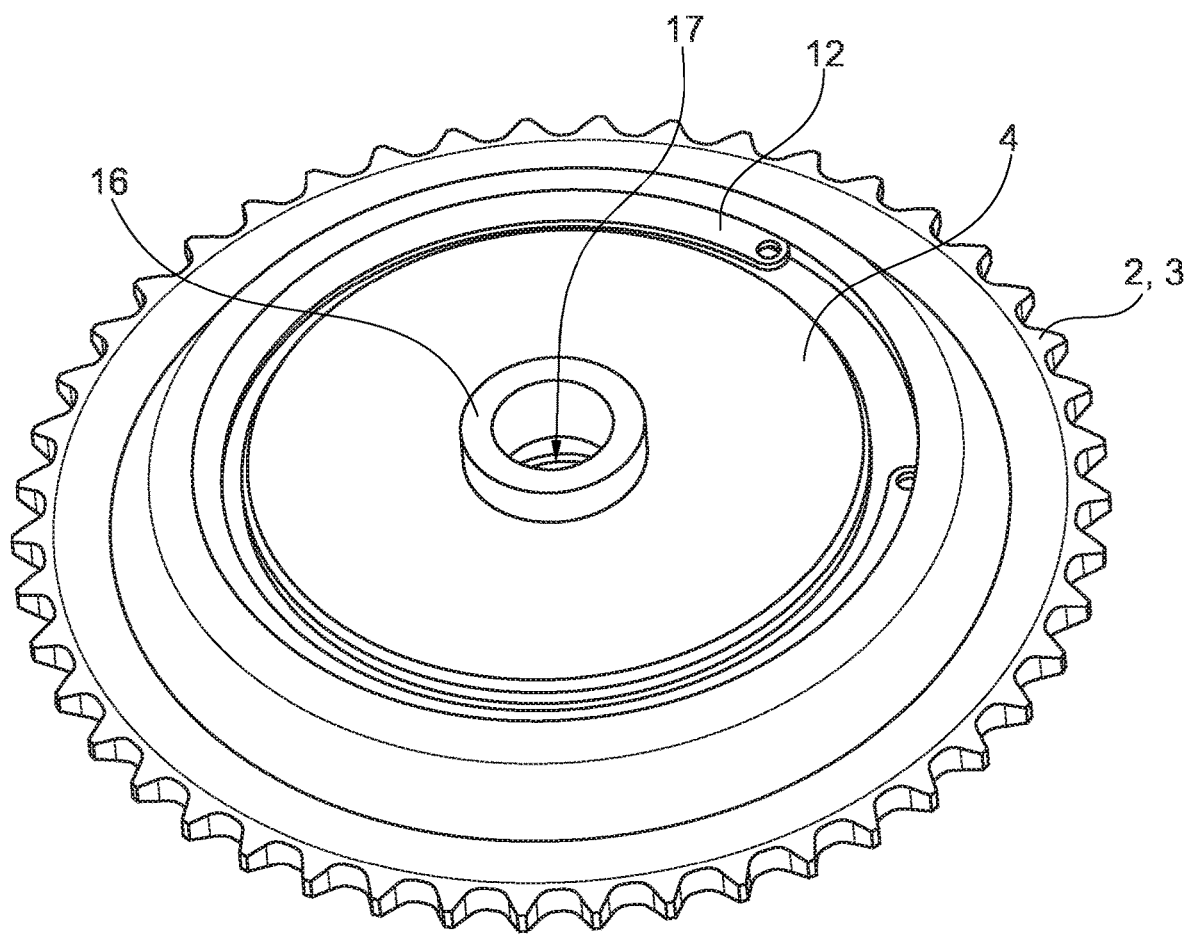
FIG. 21 shows an output-side perspective view of the harmonic drive according to FIG. 19.

The drive element 2, like the output element 4, has the basic shape of a pot. At a bottom of the drive element 2, designated in all cases with 5, which is located on the first end face $S_1$ of the harmonic drive 1, a peripheral surface which, in the case of FIG. 1, is designed as a conical outer peripheral surface 6, adjoins. In the case of FIG. 8, the bottom 5 is adjoined by a cylindrical outer peripheral surface 7, which merges into the chain wheel 3. In the case of FIG. 19, a first conical outer peripheral surface 6 adjoins the bottom 5 and extends as far as the chain wheel 3. The opposite end face of the chain wheel 3 merges into a second conical outer peripheral surface 9 which tapers toward the output-side end face $S_{AB}$. Such a second conical outer peripheral surface 9 is also given in the exemplary embodiment according to FIG. 1, but less distinctly.

In all cases, the outer peripheral surfaces 6, 7, 8, 9 are arranged radially outside of a cylindrical inner peripheral surface 10, which functions as a radial slide bearing surface with respect to the output element 4. The associated radial slide bearing surface of the output element 4 is formed by a cylindrical section 11 of the output element 4. The cylindrical section 11 is secured toward the output-side end face $S_{AB}$ by a locking ring 12 in the drive element 2. The locking ring 12 engages in a peripheral groove 13 on the inner peripheral surface of the drive element 2. In the opposite axial direction, that is to say, toward the first end face $S_1$, the output element 4 is mounted by means of an axial slide bearing surface 14 which is formed directly by the bottom 5. The bottom 5 of the drive element 2 lies opposite the bottom of the output element 4, denoted by 15, on the output-side end face $S_{AB}$. Each bottom 5, 15 is not closed, that is, it is only designed to be annular disc-shaped, wherein the bottom 15 extends further toward the central axis of the harmonic drive than the bottom 5. The inner delimitation of the bottom 15 is formed by a pin 16 which protrudes from the output-side bottom 15. When the harmonic drive 1 is installed, the aforementioned central screw, which is screwed tightly into the camshaft, is inserted through the opening marked 17, which is formed by the hollow pin 16. The camshaft to be adjusted can be a cam shaft or an exhaust camshaft of the internal combustion engine.

The adjustment range of the camshaft adjuster, which works with the harmonic drive 1 as an adjusting gear, is delimited by a rotation angle limitation designated overall by 18. The rotation angle limitation 18 is formed by a drive-side stop contour 19 and an output-side stop contour 20. The drive-side stop contour 19 is formed directly by the drive element 2 and the output-side stop contour 20 is formed directly by the output element 4. In the exemplary embodiments according to FIGS. 1 and 19, a stop segment 21 is formed on the inside of the bottom 5. This stop segment 21 extends over an angle of less than 60° in the peripheral direction of the bottom 5, which is generally annular disc-shaped. The stop segment 21 cooperates with an adjustment window 22 on the open, that is to say, first end face of the output ring gear 4. The adjustment window, also generally referred to as a recess, extends over an angle of more than 120° on the circumference of the cylindrical section 11 of the output element 4 and thus interrupts an end face bar 23 of the output element 4.

In the exemplary embodiment according to FIG. 8, on the other hand, the drive element 2 has an opening 24 which is curved in the shape of a circular arc as part of the rotation angle limitation 18. A stop segment 25 of the output element 4 engages in the opening 24. The stop segment 25 extends over an angle of less than 45° on the open end face of the output ring gear 4.

Figure 3:
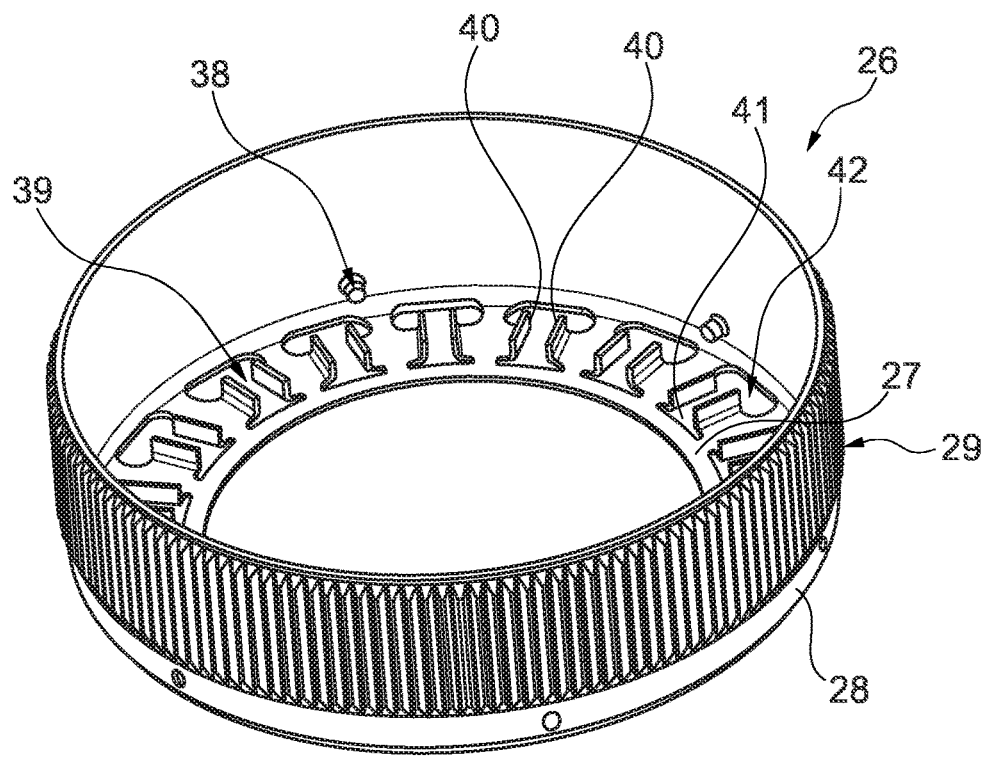
Figure 4:
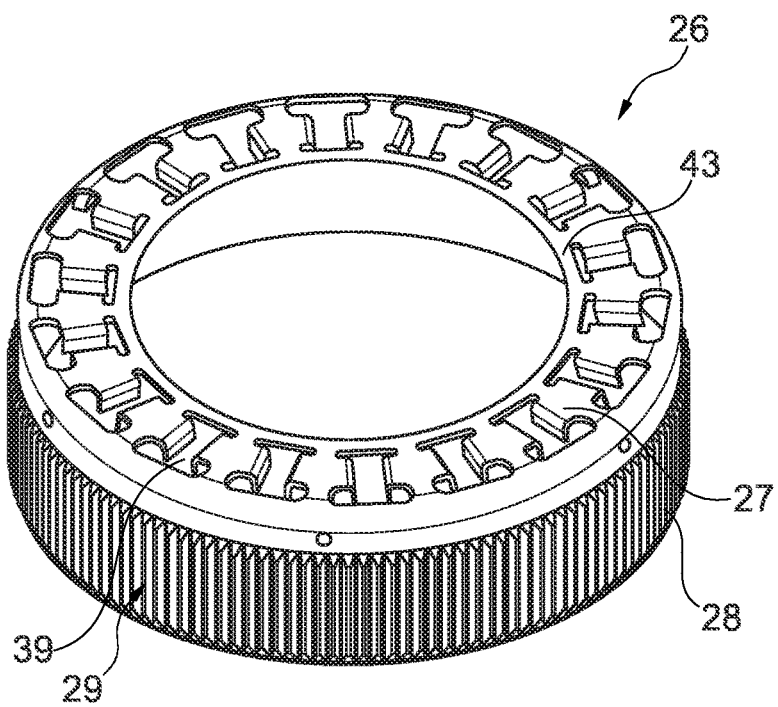
Figure 5:
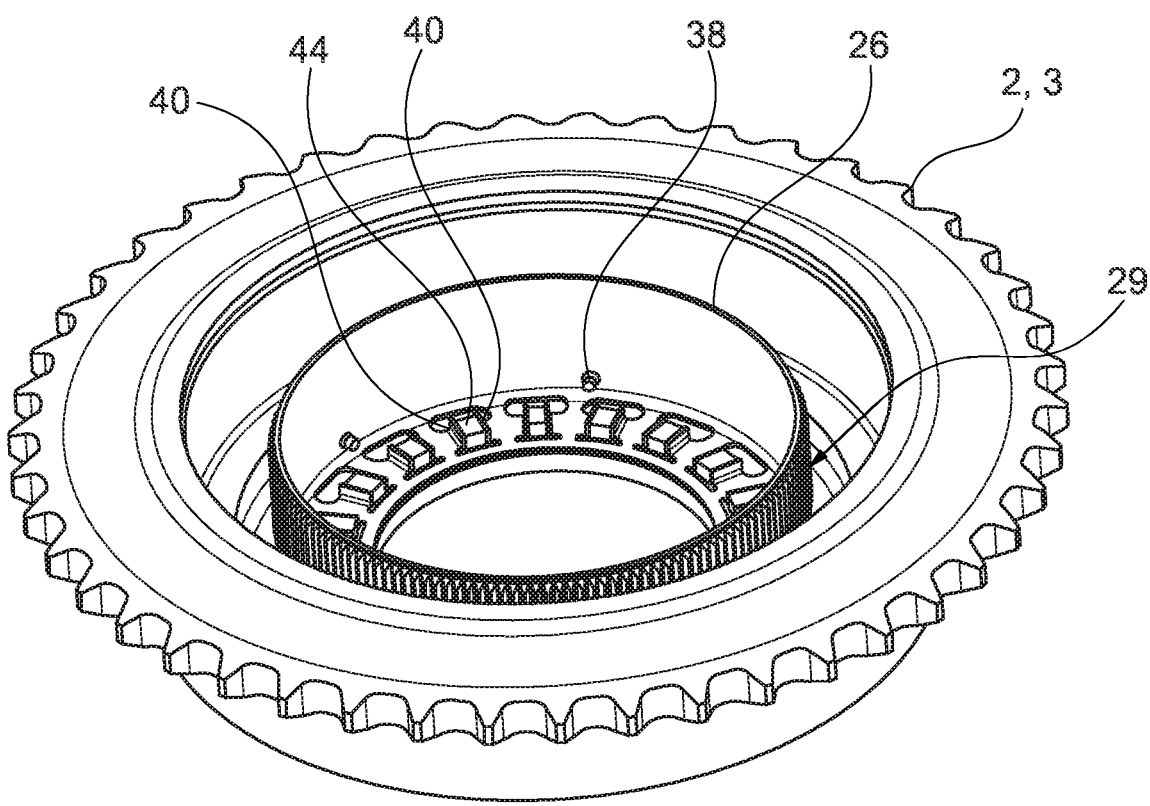
FIG. 5 shows the drive element according to FIG. 2 with inserted toothing pot.
Figure 6:
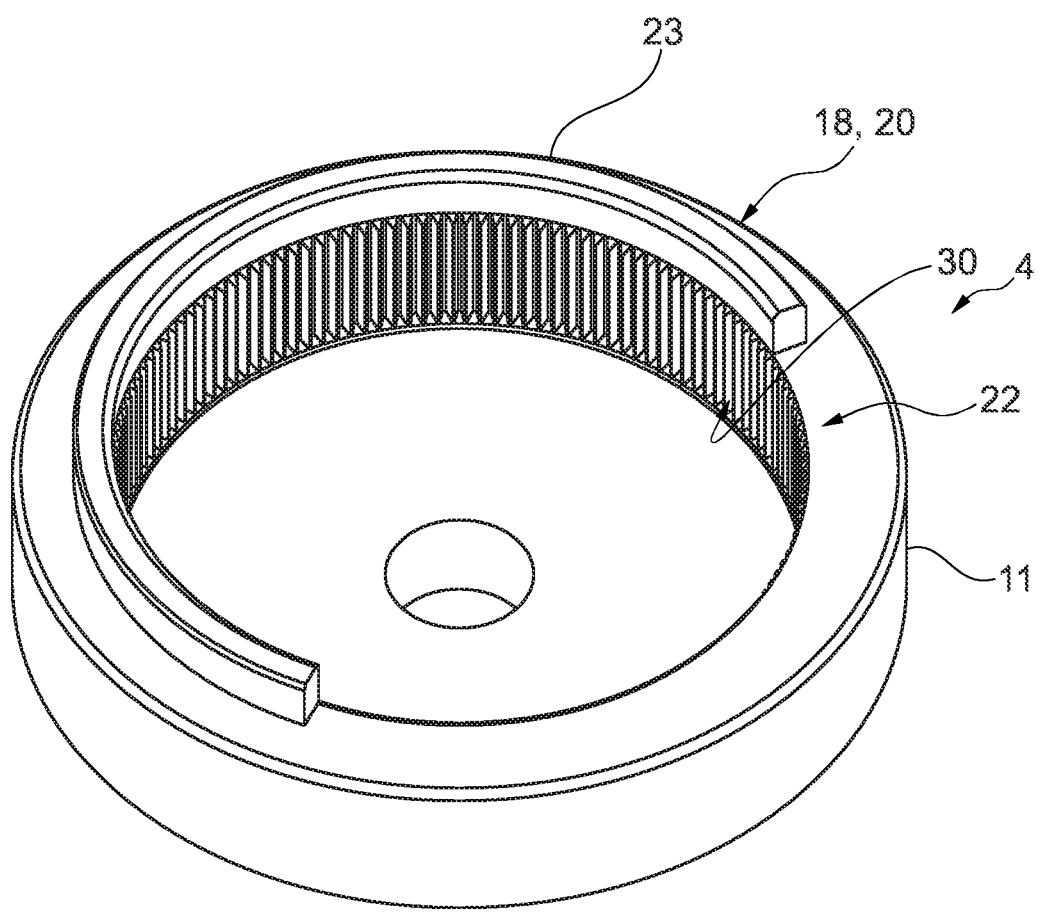
FIG. 6 shows an output element of the harmonic drive according to FIG. 1.
Figure 7:
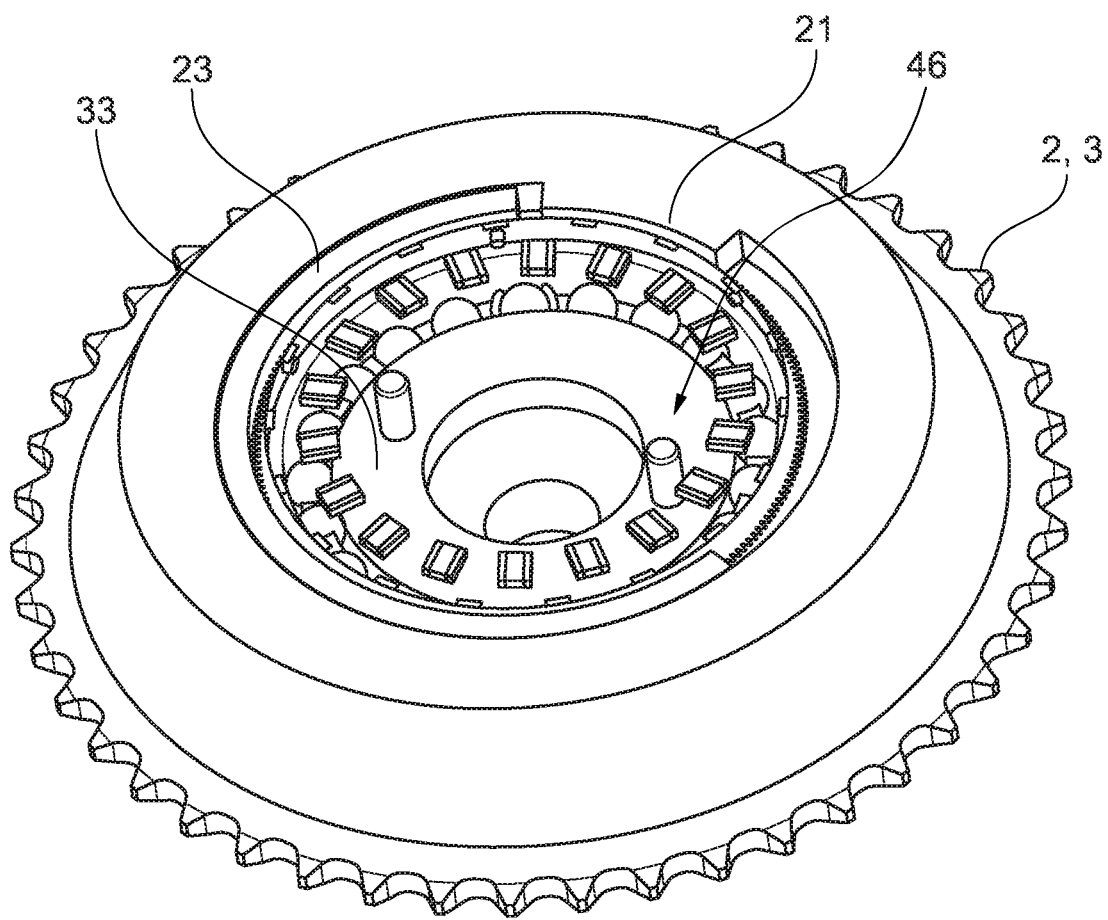
FIG. 7 shows the chain wheel according to FIG. 2 with inserted output element according to FIG. 6 as well as toothing pot according to FIG. 3 and the associated wave generator in a sectional perspective view.

In all the exemplary embodiments, a pot-shaped, flexible transmission element 26 is placed on the inside of the bottom 5, as shown in isolation in FIGS. 3 and 4. The bottom of the pot-shaped transmission element 26, which is designated by 27, that is to say, the flexible pot, has the basic shape of an annular disk which is attached to the bottom 5, which is also annular disc-shaped. The radially outer edge of the bottom 27 merges into a cylindrical section 28 of the flexible pot 26. On the outer peripheral surface of the cylindrical section 28, external teeth 29 are formed, which partially engage in internal teeth 30 of the output ring gear 4. Two diametrically opposite engagement areas between the teeth 29, 30 are determined by a wave generator 31. The wave generator 31 comprises a ball bearing designated by 32. The inner ring of the ball bearing 32, denoted by 33, is non-rotatably coupled to the motor shaft of the electric motor which is used to operate the harmonic drive 1 via bolts 34, which are to be assigned to a compensating coupling, not shown.

In a manner known per se, the outer peripheral surface of the inner ring 33 is designed as a non-circular, elliptical rolling element raceway for spheres 35, that is to say, rolling elements. The spheres 35 are guided in a cage 36 and contact an outer ring 37 which, in contrast to the inner ring 33, is resilient. The cylindrical section 28 of the flexible pot 26 directly surrounds the outer ring 37 without being permanently connected thereto. A slightly different number of teeth of the external teeth 29 on the one hand and internal teeth 30 on the other hand ensures that a full rotation of the inner ring 33 in relation to the drive element 2 is converted into only a slight pivoting between the drive element 2 and the output element 4.

The outer ring 37 and thus the entire wave generator 31 is secured in the axial direction with respect to the flexible transmission element 26 by several impressions 38, which can be seen in the form of almost point-like knobs on the inner peripheral surface of the cylindrical section 28. In the opposite axial direction, that is to say, toward the output-side end face $S_{AB}$, the wave generator 31 is secured directly in the axial direction by the bottom 15 of the output element 4.

With regard to details of the flexible transmission element 26, reference is made below to FIGS. 3 and 4, which relate to all exemplary embodiments. The bottom 27 of the flexible transmission element 26 has a plurality, eighteen in the exemplary embodiments, of openings 39. The peripheral boundaries of the openings 39 are delimited by contact flanks 40, which are also referred to as tabs for short and are formed by material which is bent out of the bottom 27. Each opening 39 merges radially inward into an inner widened section 41. Each opening 39 merges radially outward into an outer widened section 42. The widening compared to the central section delimited by the tabs 40 relates in each case to the peripheral direction of the annular disc-shaped bottom 27. Overall, each opening 39 thus has the basic shape of a double-T when viewed from the end face. In the radial direction of the transmission element 26, the outer widened section 42 is broader than the inner widened section 41. This results in an asymmetry of the double-T shape. Overall, each opening 37 extends almost over the full width to be measured in the radial direction of the annular disc-shaped bottom 27. A ring-shaped, peripheral inner edge strip of the bottom 27 is denoted by 43. The inner edge strip 43 represents the radially inner delimitation of all the openings 39. At their radially outer edge, the openings 39 extend approximately to the cylindrical section 28 of the transmission element 26. Overall, the bottom 27 thus has a significant elastic resilience.

In the peripheral direction, the bottom 27 and thus the entire flexible transmission element 26 is coupled to the bottom 5 of the drive element 2 in a form-fitting manner. For this purpose, a number of form-fitting elements 44 corresponding to the number of openings 39 is present on the inside of the bottom 5. When looking into the pot-shaped drive element 2, the form-fitting elements 44 each have a cuboid shape, with a form-fitting element 44 engaging in each opening 39. Lateral surfaces of the form-fitting elements 44 bear against the contact flanks 40 in such a way that a form-fitting coupling with little play, suitable for transmitting torque, is formed between the drive element 2 and the transmission element 26 in the peripheral direction of the elements 2, 26 mentioned. In the axial direction and the radial direction of the elements 2, 26, mobility is maintained between the bottom 27 of the flexible pot 26 and the bottom 5 so that the transmission element 26 is mounted on the drive element 2 with play.

In the exemplary embodiments according to FIGS. 1 and 19, the form-fitting elements 44 are produced by powder metallurgy as integral components of the drive element 2. In the exemplary embodiment according to FIG. 8, on the other hand, the form-fitting elements 44, like the entire drive element 2, are produced by means of forming. In this case, essentially rectangular depressions 45 can be seen on the outside of the bottom 5, which depressions were produced in the course of the shaping of the form-fitting elements 44 by material displacement. In any case, the form-fitting elements 44 interact directly with the openings 39 delimited by the contact flanks 40, which represent corresponding form-fitting elements.

When assembling the harmonic drive 1, the wave generator 31 is first inserted into the pot-shaped flexible transmission element 26 in all cases. The resulting assembly is also referred to as adjusting shaft 46. The adjusting shaft 46 is then pushed into the output ring gear 4. Here, the external teeth 29 engage in the internal teeth 30 in two mutually opposite peripheral areas. The drive element 2 is then pushed onto the output element 4 from the first end face $S_1$ until the form-fitting connection between the flexible transmission element 26 and the drive element 2 is established. As the last assembly step, the locking ring 12 is inserted into the groove 13. This provides the full functionality of the harmonic drive 1, wherein no screw connections exist within the harmonic drive 1.

LIST OF REFERENCE SYMBOLS

1 Harmonic drive
2 Drive element
3 Chain wheel
4 Output element, output ring gear
5 Bottom
6 Conical outer peripheral surface
7 Cylindrical outer peripheral surface
8 First conical outer peripheral surface
9 Second conical outer peripheral surface
10 Cylindrical inner peripheral surface; radial slide bearing surface
11 Cylindrical section of the output element
12 Locking ring
13 Groove
14 Axial slide bearing surface
15 Bottom
16 Pin
17 Opening
18 Rotation angle limitation
19 Drive-side stop contour
20 Output-side stop contour
21 Stop segment
22 Recess, adjustment window
23 Strip
24 Opening
25 Stop segment
26 Flexible transmission element, flex ring
27 Bottom
28 Cylindrical section
29 External teeth
30 Internal teeth
31 Wave generator
32 Ball bearing
33 Inner ring
34 Bolt
35 Rolling elements, sphere
36 Cage
37 Outer ring
38 Impression
39 Opening
40 Contact flank
41 Inner widened section
42 Outer widened section
43 Inner edge strip
44 Form-fitting element
45 Depression
46 Adjusting shaft
$S_{AB}$ Output-side end face
$S_1$ First end face

What is claimed is:

1. A harmonic drive comprising:
a drive element;
a flexible transmission element connected to the drive element and having external teeth; and
an output element configured as a ring gear and having internal teeth that partially mesh with the external teeth, the flexible transmission element being pot-shaped, and being coupled in a torque-transmitting manner to the drive element radially inside the external teeth by torque-transmitting surfaces formed as part of the flexible transmission element.

2. The harmonic drive according to claim 1, wherein the flexible transmission element is coupled to the drive element in a form-fitting manner.

3. The harmonic drive according to claim 2, wherein the flexible transmission element has a bottom with openings, into which form-fitting elements of the drive element engage.

4. The harmonic drive according to claim 3, wherein the openings are delimited in both peripheral directions of the transmission element by contact flanks bent out of the bottom of the flexible transmission element.

5. The harmonic drive according to claim 1, wherein a rotation angle limitation is formed between the drive element and the output element.

6. The harmonic drive according to claim 5, wherein the rotation angle limitation is formed by a stop segment of the drive element and a recess in an otherwise ring-shaped, circumferential end face strip of the output element.

7. The harmonic drive according to claim 5, wherein the rotation angle limitation is formed by an opening in the drive element and a stop segment of the output element engaging in the opening.

8. The harmonic drive according to claim 1, wherein the drive element is a sintered part.

9. A method for producing a harmonic drive, comprising the following steps:
providing a pot-shaped drive element configured as a transmission element of a continuously variable transmission, first form-fitting elements being formed on a bottom of the pot-shaped drive element;

providing a flexible pot-shaped externally toothed transmission element, second form-fitting elements being formed on a bottom of the flexible pot-shaped externally toothed transmission element;

providing a wave generator configured to deform the pot-shaped externally toothed flexible transmission element;

providing a pot-shaped internally toothed output element;

inserting the wave generator into the flexible pot-shaped externally toothed transmission element to form an assembly;

inserting the assembly into the pot-shaped internally toothed output element;

sliding the pot-shaped drive element onto the pot-shaped internally toothed output element until a connection suitable for transmitting a torque is established between the first form-fitting elements and the second form-fitting elements; and securing the pot-shaped internally toothed output element with respect to the pot-shaped drive element in an axial direction by a locking ring.

10. The method according to claim 9, wherein a chain wheel produced by forming technology is used as the pot-shaped drive element.

11. A harmonic drive comprising:

a drive element being pot-shaped and including a bottom and a cylindrical outer peripheral surface radially outside the bottom and adjoined to the bottom;

a flexible transmission element connected to the drive element and having external teeth; and an output element configured as a ring gear and having internal teeth that partially mesh with the external teeth, the flexible transmission element being coupled in a torque-transmitting manner to the bottom of the drive element radially inside the external teeth, wherein the flexible transmission element is pot-shaped and formed as a single piece, the flexible transmission element including a bottom and a cylindrical section radially outside the bottom and adjoined to the bottom, the bottom of the flexible transmission element being coupled in the torque-transmitting manner to the bottom of the drive element, wherein the bottom of the drive element includes first form-fitting elements and the bottom of the flexible transmission element includes second form-fitting elements, the first form-fitting elements engaging the second form-fitting elements in the torque-transmitting manner.

12. The harmonic drive as recited in claim 11, wherein lateral surfaces of the first form-fitting elements bear against contact flanks of the second form-fitting elements to form a form-fitting coupling between the flexible transmission element and the drive element.

13. The harmonic drive as recited in claim 11, wherein the output element is received inside of the cylindrical outer peripheral surface of the drive element.

14. The harmonic drive as recited in claim 11, further comprising a wave generator configured to deform the flexible transmission element, the wave generator being received inside of the flexible transmission element.

15. The harmonic drive as recited in claim 14, wherein the wave generator is received axially between the bottom of the drive element and a bottom of the output element.

16. The harmonic drive as recited in claim 11, wherein the harmonic drive is a camshaft adjuster, the drive element including a first stop contour and the output element including a second stop contour, the first stop contour and the second stop contour forming a rotation angle limitation delimiting an adjustment range of the camshaft adjuster.

* * * * *